United States Patent
Castro

(10) Patent No.: US 6,911,796 B2
(45) Date of Patent: Jun. 28, 2005

(54) POWER CONTROL DEVICE

(75) Inventor: Morris Castro, Chardstock (GB)

(73) Assignee: Westland Helicopters LTD, Yeovil (GB)

( * ) Notice: Subject to any disclaimer, the term of this patent is extended or adjusted under 35 U.S.C. 154(b) by 0 days.

(21) Appl. No.: 10/299,804

(22) Filed: Nov. 20, 2002

(65) Prior Publication Data

US 2003/0102835 A1 Jun. 5, 2003

(30) Foreign Application Priority Data

Dec. 1, 2001 (GB) ............................................. 0128844

(51) Int. Cl.$^7$ .............................. H02P 5/00; H02P 7/00; B60S 1/02
(52) U.S. Cl. ........................ 318/443; 318/444; 318/811; 318/599; 318/DIG. 2; 15/250.12
(58) Field of Search ................................ 318/599, 811, 318/439, 561, 139, 443, DIG. 2, 444, 801; 15/250.12; 363/124, 127, 129; 307/125, 127, 130; 323/271, 282, 234, 265, 281, 288, 290

(56) References Cited

U.S. PATENT DOCUMENTS

| | | | |
|---|---|---|---|
| 3,854,079 A | | 12/1974 | Brown |
| 4,316,132 A | * | 2/1982 | Geppert ..................... 318/723 |
| 4,465,961 A | * | 8/1984 | Landino ..................... 318/811 |
| 4,473,784 A | * | 9/1984 | Morez ........................ 318/439 |
| 4,611,154 A | * | 9/1986 | Lambropoulos et al. .... 318/490 |
| 4,772,995 A | * | 9/1988 | Gautherin et al. ......... 363/21.1 |
| 4,873,453 A | * | 10/1989 | Schmerda et al. .......... 307/130 |
| 5,241,248 A | * | 8/1993 | Furukoshi ................... 318/444 |
| 5,267,344 A | * | 11/1993 | Nelson, III ................. 388/811 |
| 5,355,061 A | * | 10/1994 | Forhan ....................... 318/443 |
| 5,404,085 A | * | 4/1995 | Resch et al. ................ 318/443 |
| 5,602,448 A | * | 2/1997 | Yaguchi ..................... 318/139 |
| 5,874,818 A | * | 2/1999 | Schuurman ................ 318/439 |
| 5,932,983 A | * | 8/1999 | Maue et al. ................ 318/490 |
| 6,005,784 A | * | 12/1999 | Ikeshita ....................... 363/37 |
| 6,060,859 A | * | 5/2000 | Jonokuchi ................... 318/801 |
| 6,285,146 B1 | * | 9/2001 | Harlan ........................ 318/254 |
| 6,321,031 B1 | | 11/2001 | Mohr et al. |

FOREIGN PATENT DOCUMENTS

| | | | | |
|---|---|---|---|---|
| GB | 2 254 496 | | 10/1992 | |
| JP | 03107390 A | * | 5/1991 | ............ H02P/6/02 |
| JP | 05077688 A | * | 3/1993 | ............ B60S/1/08 |
| JP | 2001315620 | | 11/2001 | |
| WO | WO 00/26733 | | 5/2000 | |

OTHER PUBLICATIONS

Woodworth, "MOSFETs control motors in automotive applications", Electronic Components and Applications, vol. 9, No. 2, pp. 91–100.

* cited by examiner

Primary Examiner—David Martin
Assistant Examiner—Eduardo Colon Santana
(74) Attorney, Agent, or Firm—Stites & Harbison PLLC; Douglas E. Jackson

(57) ABSTRACT

A power control device for positioning at a low voltage side of a load for controlling the electrical power available to the load, from a main power supply, the power control device including a current switch for switching current on and off under the control of a pulse width modulating device thus to control the power available to the load, the pulse width modulating device being operated by power derived from the main power supply.

10 Claims, 1 Drawing Sheet

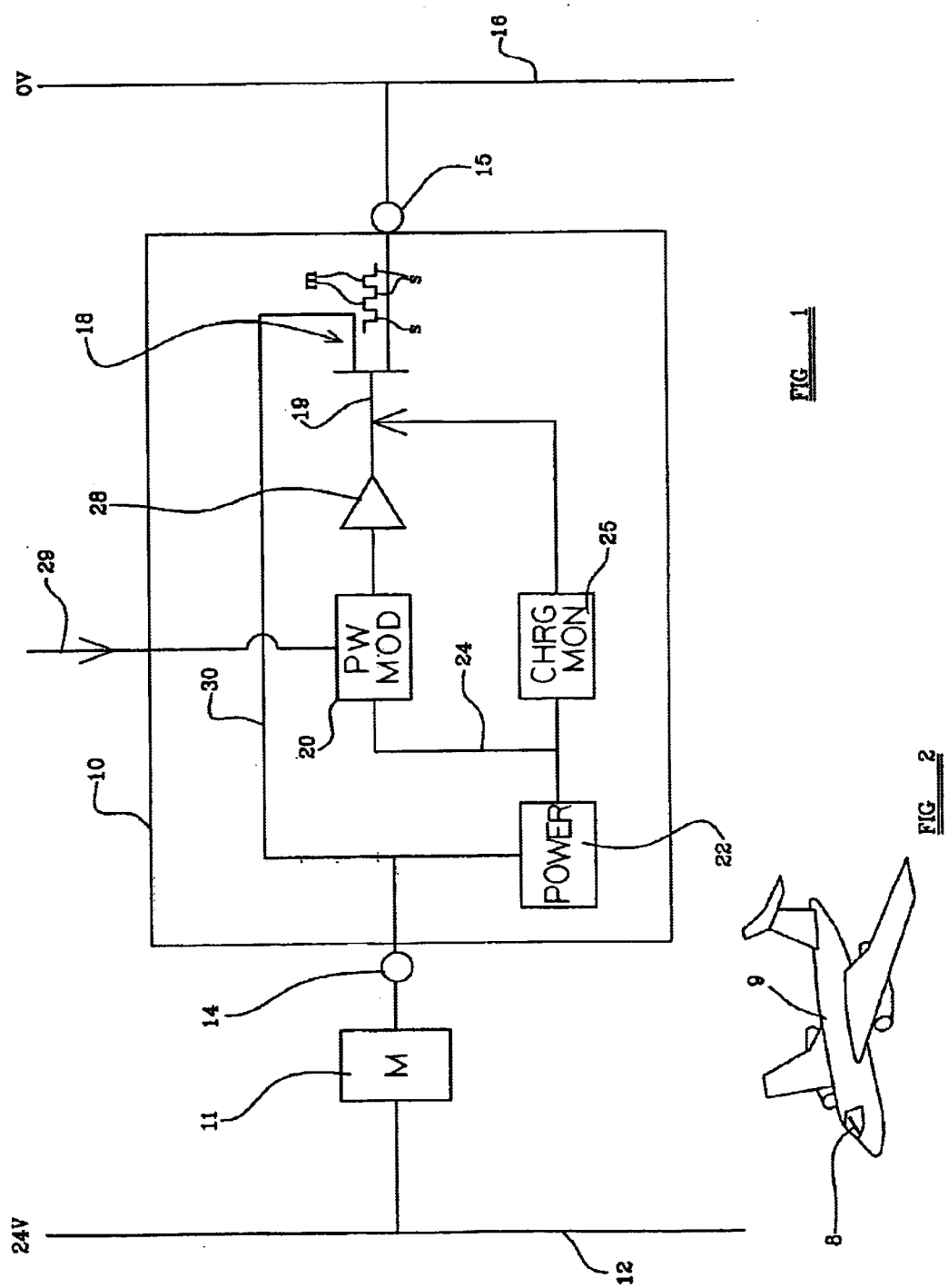

POWER CONTROL DEVICE

BACKGROUND TO THE INVENTION

This invention relates to a power control device and more particularly but not exclusively to a power control device for controlling power available to a motor, in order to control motor speed. The invention has been developed primarily for use in controlling the speed of a windscreen wiper motor for an aircraft, but may be used for controlling motor speeds in other applications, or indeed for controlling the power available for a light in order to vary the intensity of the light, or otherwise where it is desired to control power available to an electrical load.

DESCRIPTION OF THE PRIOR ART

In the case of a windscreen wiper for an aircraft such as a helicopter, it is desirable for the windscreen wiper to be operable at least at two operating speeds, to suit different weather conditions. It is desirable in an aircraft application to use a common drive motor so as not to increase weight unduly, and conventionally a series resistor is provided at the low voltage side of the motor, through which resistor current may be passed to reduce the voltage across the drive motor and hence the power available to the motor, thus to slow the drive motor.

Whilst this provides a simple and economic way of achieving two windscreen wiper speeds, at the slow speed when current is passing through the series resistor, energy is lost across the resistor in the form of heat which is inefficient. Under conditions of increased resistance to the wiping action of the wipers, when the motor will slow down, back EMFs in the motor will decrease and current through the motor and the series resistor will thus increase.

The series resistor will dissipate the additional power as heat, and in continuous extreme circumstances, the resistor may fail.

Whereas it would be possible to protect the series resistor e.g. with a positive temperature coefficient device which restricts or prevents current passing through the series resistor as temperature increases, when the positive temperature coefficient device is actuated, the motor drive will be completely closed down which would be undesirable. The option of providing two drive motors, one for fast and one for slow wiper speeds is undesirable because of the added weight and cost, and provision of a second motor is likely to require changes to the aircraft infrastructure and will add weight which again is undesirable.

It is known to control the electrical power available to an electrical load in order to control operational parameters of an apparatus including the load using a so called pulse width modulation means. For example in the case of an apparatus including an electric motor, the current for the load may be switched on and off sequentially by a power controller, usually many times per second, with the "on" time relative to the "off" time being variable by the pulse width modulation means, in order to vary the power available to the motor, thus to vary motor speed.

Where such a power controller is provided at the low voltage side of a load, it will be appreciated that the power controller will itself require a power supply separate from a main power supply which is being controlled, in order to provide its control function, which power in a conventional arrangement may not be readily available in an aircraft without infrastructure modifications.

SUMMARY OF THE INVENTION

According to a first aspect of the invention we provide a power control device for positioning at a low voltage side of a load, for controlling the electrical power available to the load from a main power supply, the power control device including current switching means for switching current on and off under the control of a pulse width modulating means thus to control the power available to the load, the pulse width modulating means being operated by power derived from the main power supply.

Thus in a device in accordance with the invention, there is no need to provide a separate power supply for the pulse width modulating means. In an aircraft windscreen wiper application, the power control device may thus be fitted e.g. in the place of a series resistor, without requiring any or at least no major infrastructure changes to the aircraft. Thus the invention provides a novel and inventive solution to the problem of controlling the speed of a windscreen wiper without the risk of series resistor failure.

In a preferred embodiment, current to power the pulse width modulating means is drawn through the load whilst the current switching means is switched off by the pulse width modulation means. Preferably a charging means such as a capacitor is provided which is charged whilst the current switching means is switched off, and discharges when the current switching means is switched on so that power is available to the pulse width modulation means from the charging means when the current switching means is switched on, and from the main power supply when the current switching means is switched off, whereby power is available to the pulse width modulation means at all relevant times.

The power control device may include a charge monitoring means to ensure that adequate power is available to the pulse width modulation means to maintain the function of the pulse width modulation means. The monitoring means may for example be operable to switch off the current switching means to ensure that power is available to the pulse width modulation means in the event for example that the current "off" time is too short for the capacitor or other charging means to charge up adequately.

The current switching means typically would be a semiconductor switching means such as a transistor. The pulse width modulation means may include a waveform generator the mark/space ratio of the generated waveform being changeable to change the power available to the load, or a separate waveform generator may be provided, with the pulse width modulation means being operable to change the mark/space ratio of the waveform.

Whereas the pulse width modulation means may be capable only of providing to the current switching means, waveforms of two alternative mark/space ratios, so that only two alternative power levels may be available to the load, if desired, the pulse width modulation means may be capable of providing waveforms with a plurality of alternative mark/space ratios so that a corresponding plurality of power levels may be available to the load. In each case a control may be provided to control the pulse width modulation means to provide a waveform with a desired mark/space ratio.

The load may be a D.C. electrical motor for example for driving a windscreen wiper, such as a windscreen wiper for an aircraft, although the invention has many other applications.

According to a second aspect of the invention we provide a power control device positionable at a low voltage side of an electric motor, for controlling the electrical power available to the motor from a main power supply, the device including current switching means for switching current on and off under the control of a pulse width modulating means thus to vary the power available to the motor, the pulse width modulating means being operated by power derived from the main power supply.

According to a third aspect of the invention we provide a vehicle having a power control device according to the first aspect of the invention.

BRIEF DESCRIPTION OF THE DRAWINGS

Embodiments of the invention will now be described with reference to the accompanying drawings in which:

FIG. 1 is an illustrative circuit diagram of a power control device for an electrical motor, in accordance with the invention, and FIG. 2 is an illustrative view of an aircraft in which the present invention may be incorporated.

DESCRIPTION OF THE PREFERRED EMBODIMENTS

Referring to FIG. 1 of the drawings there is shown a power control device 10 for controlling the supply of electrical power to a motor 11. In this example, the motor 11 is a windscreen wiper 8 motor for an aircraft 9 (see FIG. 2), the aircraft 9 having a 24V D.C. main power supply 12 and the power control device is provided at a low voltage side of the motor 11 load. Windings of the motor 11 provide an electrical load, and the rotational speed of the motor 11 and hence the speed of operation of the windscreen wiper, is dependent upon the power supplied to the windings of the motor 11. As the voltage across the motor 11 is substantially constant, the rotational speed of the motor 11 can be varied by varying the current supplied to the motor 11.

The power control device 10 is in series with the motor 11 and the power control device 10 controls the power supplied to the motor 11 by switching the current drawn through windings of the motor 11 on and off sequentially. By varying the "on" current time relative to the "off" current time in any time interval, the average current and thus the power supplied to the motor 11 can thus be varied. The power control device 10 includes a first terminal 14 connected to the motor 11, and a second terminal 15 connected to a low or zero voltage rail 16.

The power control device 10 includes a current switching means 18 which in the present example is a transistor or like semiconductor device. When current is supplied to a base terminal 19 of the switching means 18, current may flow through the motor 11, to the first terminal 14 and then via a main supply line 30, through the switching device 18, and hence to the second terminal 15 and to the low or zero voltage line 16.

As is well known in the art of electronics, the current supply to the base terminal 19 of the switching means 18 is controlled by a pulse width modulation means 20. The pulse width modulation means 20 generates a waveform, usually a square wave, each cycle of which includes a current "on" or "mark" part m, and a current "off" or "space" part s and by modulating the mark/space ratio of the waveform, the average current in any time interval passing to the second terminal 15 may thus be varied.

Thus the average current and hence power available to the motor 11 windings can be changed, by varying the mark/space ratio m/s of the waveform provided by the pulse width modulation means 20.

It will be appreciated that for the pulse width modulation means 20 to operate, power is required for the pulse width modulation means 20 which because the power control device 10 is at the low voltage side of the motor 11, conventionally would have to be supplied by a separate power supply to the main power supply 12. However, in a vehicular application, such as for example an aircraft 9, to provide such a separate power supply for the pulse width modulation means 20 may require expensive and undesirable modifications to the aircraft 9 infrastructure.

In accordance with the invention, power for the pulse width modulation means 20 is derived from the main power supply 12 at the first terminal 14 of the power control device 10.

In this example, power for the pulse width modulating means 20 is derived from the main power supply 12 by a power supply unit 22 which includes a charging circuit with a capacitor. The power supply unit 22 allows the capacitor to charge up when the pulse width modulation means 20 is providing the "space" s parts of the waveform which cause the current switching means 18 to switch off or substantially switch off the current flow through the device 10. During this charging up of the capacitor, the power supply unit 22 simultaneously provides power to the pulse width modulation means 20.

When the pulse width modulation means 20 is generating the "mark" m parts of the waveform which cause the current switching means 18 to switch on the current flow through the device 10, the power supply unit 22 allows the capacitor to discharge thus to maintain power to the pulse width modulation means 20.

Thus during both the mark m and space s parts of the waveform provided by the pulse width modulation means 20, power is available to the pulse width modulation means 20, via the line indicated at 24 in the drawing.

To ensure that adequate power is always available to the pulse width modulation means 20 to maintain the function of the pulse width modulation means 20, charge monitoring means 25 is provided. The monitoring means 25 is arranged to switch off the current switching means 18 to ensure that power is available to charge the capacitor and hence provide power to the pulse width modulation means 20 in the event for example, that the current "on" time m is too great relative to the current "off" time s for the capacitor of the power supply unit 22 to charge up adequately during normal "off" periods.

In the example of the drawing, in order to achieve an adequate current level at the base 19 of the transistor or other current switching means 18 for the current switching means 18 to switch on and allow current flow from the main supply line 12 to the second terminal 15, a signal is required from the monitoring means 25 in addition to the waveform provided by the pulse width modulation means 20. Thus in the absence of adequate power being available from the capacitor of the power supply unit 22, the current switching means 18 is switched off.

The power control device 10 includes a buffer 28 which provides the function of a power booster to condition the waveform produced by the pulse width modulation means 20 to improve switching of the current switching means 18.

In one embodiment, the pulse width modulation means 20 is capable only of providing a waveform with one mark/space ratio, according to a control signal provided from a manual or automatic control along a control line 29. Thus the motor 11 may be operated at one of two speeds only, e.g. fast speed for operating the windscreen wiper 8 in heavier rain etc. conditions when a full current supply is provided to the motor 11, and a slow speed for operating the windscreen wiper in light rain etc. conditions, e.g. when the power available to the motor 11 is modulated by the device 10 of the invention, as selected by a pilot of the aircraft 9.

If desired though, the motor 11 speed may have more than two alternative operating speeds, the pulse width modulation means 20 being operated by signals on the control line 29 selectively to provide more than two, e.g. an infinite number of, alternative mark/space ratio waveforms.

Various modifications may be made without departing from the scope of the invention.

For example, instead of the transistor current switching device 18, an alternative switching device 18 may be provided. The power supply unit 22 or another waveform generator may generate a waveform, the mark/space ratio of which is modulated by the pulse width modulation means 20. The waveform which is provided to the switching means 18 need not be a square waveform although this is preferred.

The power control device 10 may be provided as an integrated module, e.g. provided as a single microchip, or may be provided by separate components as desired.

The invention may be applied otherwise than for controlling the power supplied to a windscreen wiper 8 motor 11 for an aircraft 9, and may be used for controlling the speed of a motor in any other desired vehicular or non-vehicular application where the device 10 is positioned at a low voltage side of a load. Moreover, the invention may be applied to control the power supplied to loads other than motor windings, such as for example only, an electrical light, so that the intensity of the light may be varied by changing the average current and hence power supplied to the light.

What is claimed is:

1. An aircraft wiping system for an aircraft comprising:
   an aircraft windscreen;
   an aircraft main DC power supply;
   a DC windscreen wiper motor which is actuated to move a windscreen wiper across the aircraft windscreen, the wiper motor being connected to the aircraft power supply so that a high voltage side and a low voltage side of the wiper motor are present; and
   a power control device which is connected at the low voltage side of the wiper motor, for controlling the electrical power available to the wiper motor from the main power supply, the power control device including
   a) a pulse width modulating device connected to the low voltage side of the wiper motor, the pulse width modulating device operating by power derived from the main cower supply, and
   b) a current switch located at the low voltage side of the wiper motor for switching current on and off to the wiper motor under the control of the pulse width modulating device, the current switch thus controlling the power to the wiper motor.

2. An aircraft wiping system according to claim 1 wherein current to power the pulse width modulating device is drawn through the wiper motor whilst the current switch is switched off by the pulse width modulation device.

3. An aircraft wiping system according to claim 1 wherein a charging apparatus located at the low voltage side of the wiper motor is provided which is charged whilst the current switch is switched off, and discharges when the current switch is switched on so that power is available to the pulse width modulation device from the charging apparatus when the current switch is switched on, and from the main power supply when the current switch is switched off.

4. An aircraft wiping system according to claim 1 further including a charge monitoring apparatus located at the low voltage side of the wiper motor to ensure that adequate power is available to the pulse width modulation device to maintain the function of the pulse width modulation device.

5. An aircraft wiping system according to claim 4 wherein the charge monitoring apparatus is operable to switch off the current switch to ensure that power is available to the pulse width modulation means.

6. An aircraft wiping system according to claim 1 wherein the current switch is a semiconductor switching device.

7. An aircraft wiping system according to claim 1 wherein the pulse width modulation device includes a waveform generator the mark/space ratio of the generated waveform being changeable to change the power available to the wiper motor.

8. An aircraft wiping system according to claim 1 wherein the pulse width modulation device is adapted to vary the mark/space ratio of a waveform provided to it by a separate waveform generator to change the power available to the wiper motor.

9. An aircraft wiping system according to claim 1 wherein the pulse width modulation device is capable of providing waveforms of at least two alternative mark/space ratios, so that two alternative power levels are available to the wiper motor.

10. An aircraft wiping system according to claim 9 wherein a control is provided to control the pulse width modulation device to provide a waveform with a desired mark/space ratio.

* * * * *